(12) United States Patent
White et al.

(10) Patent No.: US 9,024,909 B2
(45) Date of Patent: May 5, 2015

(54) SENSING

(75) Inventors: Richard White, Huntingdon (GB); Jani Kivioja, Lower Cambourne (GB); Darryl Cotton, St.Ives (GB); Samiul Md Haque, Chesterton (GB); Piers Andrew, Cambridge (GB); Tapani Ryhanen, Helsinki (FI)

(73) Assignee: Nokia Corporation, Espoo (FI)

( * ) Notice: Subject to any disclaimer, the term of this patent is extended or adjusted under 35 U.S.C. 154(b) by 97 days.

(21) Appl. No.: 13/437,276

(22) Filed: Apr. 2, 2012

(65) Prior Publication Data

US 2013/0257787 A1    Oct. 3, 2013

(51) Int. Cl.
G06F 3/045 (2006.01)
G06F 3/044 (2006.01)
G06F 3/041 (2006.01)

(52) U.S. Cl.
CPC .............. G06F 3/044 (2013.01); G06F 3/0414 (2013.01); G06F 2203/04102 (2013.01)

(58) Field of Classification Search
CPC .................. G06F 2203/04102; G06F 3/0414; G06F 3/044
USPC ........................ 345/156, 167, 168, 173–184; 178/18.01–18.09, 19.01–19.04, 20.01
See application file for complete search history.

(56) References Cited

U.S. PATENT DOCUMENTS

| | | | |
|---|---|---|---|
| 2007/0257017 A1* | 11/2007 | Deangelis et al. | 219/211 |
| 2010/0060077 A1 | 3/2010 | Paulus et al. | 307/10.1 |
| 2010/0091468 A1 | 4/2010 | Tsao | 361/749 |
| 2010/0141605 A1 | 6/2010 | Kang et al. | 345/174 |
| 2010/0201635 A1 | 8/2010 | Klinghult et al. | 345/173 |
| 2010/0245246 A1 | 9/2010 | Rosenfeld et al. | 345/163 |
| 2011/0115732 A1* | 5/2011 | Coni et al. | 345/173 |
| 2011/0141052 A1* | 6/2011 | Bernstein et al. | 345/174 |
| 2011/0242138 A1* | 10/2011 | Tribble | 345/663 |
| 2011/0248929 A1 | 10/2011 | Tong et al. | 345/173 |
| 2011/0273399 A1* | 11/2011 | Lee | 345/174 |
| 2012/0038583 A1* | 2/2012 | Westhues et al. | 345/174 |
| 2012/0086667 A1 | 4/2012 | Coni et al. | 345/174 |
| 2012/0090757 A1 | 4/2012 | Buchan et al. | 156/60 |
| 2012/0275621 A1 | 11/2012 | Elko | 381/92 |

FOREIGN PATENT DOCUMENTS

DE    20 2012 10336 U1    9/2012

* cited by examiner

Primary Examiner — Kumar Patel
Assistant Examiner — Insa Sadio
(74) Attorney, Agent, or Firm — Harrington & Smith

(57) ABSTRACT

An apparatus including a capacitance touch sensor arrangement configured to have a variable capacitance that varies when a user finger touches the capacitance touch sensor arrangement; and at least one variable resistor sensor integrated within the capacitance touch sensor arrangement wherein the variable resistor sensor has a variable resistance that varies with a sensed parameter; the apparatus including an input configured to receive an input signal including a time varying component and an output configured to provide an output signal that depends upon both the capacitance of the capacitance touch sensor arrangement and the resistance of the variable resistance sensor.

20 Claims, 5 Drawing Sheets

Schematic of deformation under pressure applied from a finger.

SENSING

TECHNOLOGICAL FIELD

Embodiments of the present invention relate to sensing.

BACKGROUND

A capacitance touch sensor arrangement may be used to detect a user touch. When a user touches the touch sensor arrangement charge is sourced from or sunk at the user changing the capacitance of the touch sensor arrangement. This enables the touch to be detected.

BRIEF SUMMARY

According to various, but not necessarily all, embodiments of the invention there is provided an apparatus comprising: a capacitance touch sensor arrangement configured to have a variable capacitance that varies when a user finger touches the capacitance touch sensor arrangement; and at least one variable resistor sensor integrated within the capacitance touch sensor arrangement wherein the variable resistor sensor has a variable resistance that varies with a sensed parameter; the apparatus comprising an input configured to receive an input signal comprising a time varying component and an output configured to provide an output signal that depends upon both the capacitance of the capacitance touch sensor arrangement and the resistance of the variable resistance sensor.

According to various, but not necessarily all, embodiments of the invention there is provided a method of manufacturing a capacitance touch sensor arrangement comprising at least one integrated variable resistor, comprising: selectively forming a plurality of first capacitor electrodes; selectively forming a plurality of second capacitor electrodes; and selectively forming at least one variable resistor sensor in electrical connection with a capacitor formed between a first capacitor electrode and an adjacent second capacitor electrode.

BRIEF DESCRIPTION

For a better understanding of various examples of embodiments of the present invention reference will now be made by way of example only to the accompanying drawings in which.

Figure 6:
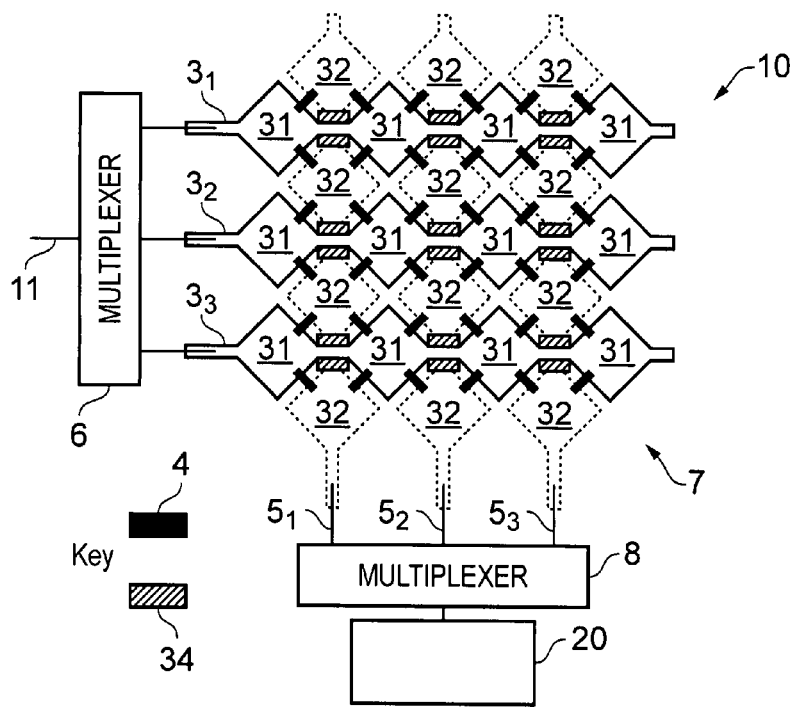
FIG. 6 illustrates an example of a capacitance touch sensor arrangement comprising an integrated variable resistor sensor, where the capacitance touch sensor arrangement comprises a plurality of capacitor cells that are distributed over an area in a regular array and where the capacitor electrodes do not overlap.
Figure 7:
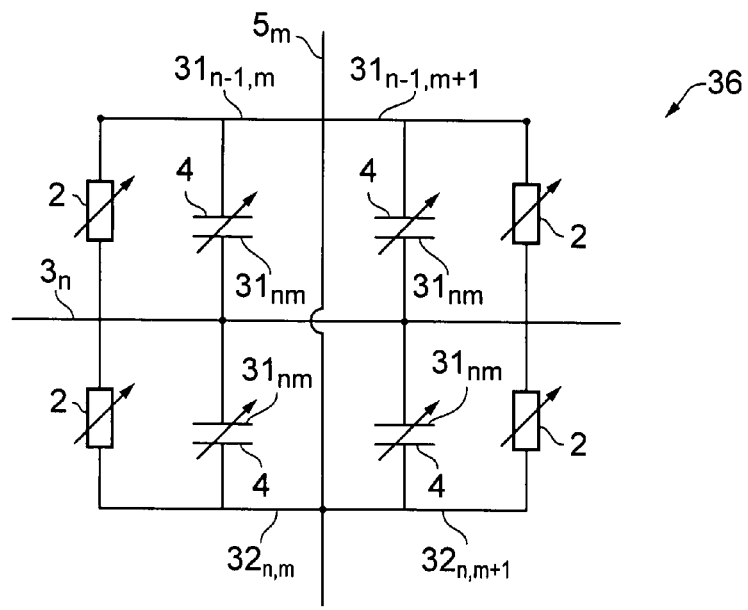
Figure 8A:
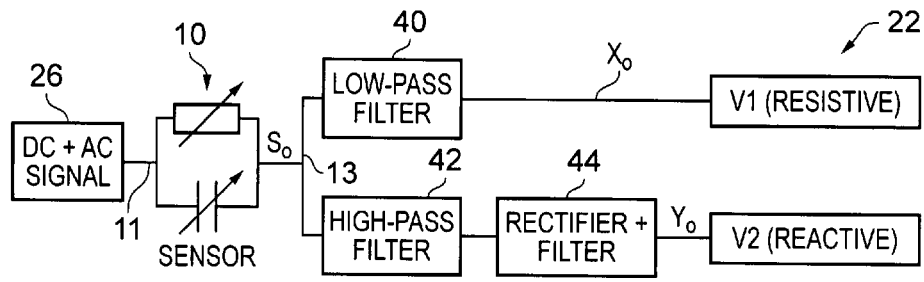
Figure 8B:
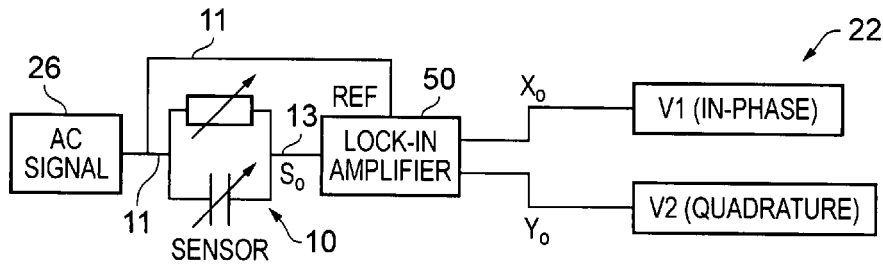
Figure 9:
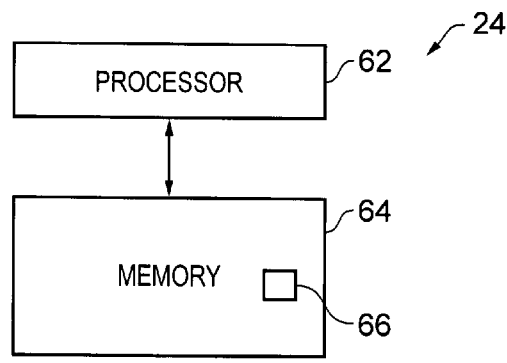
Figure 10:
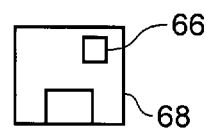
Figure 11:
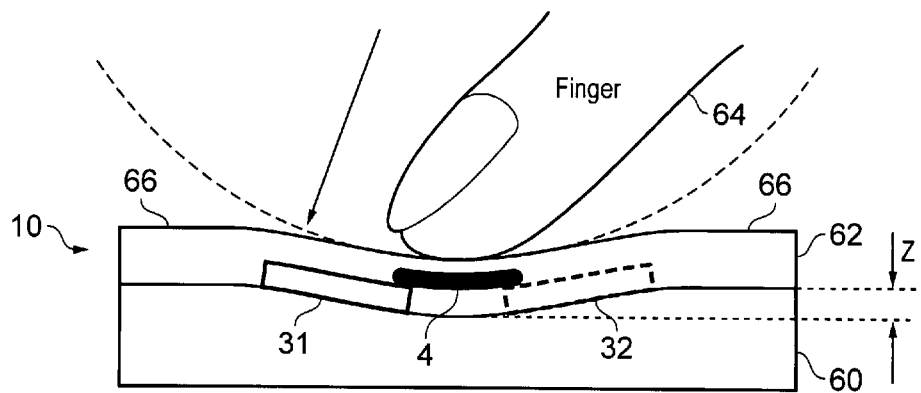
Figure 12:
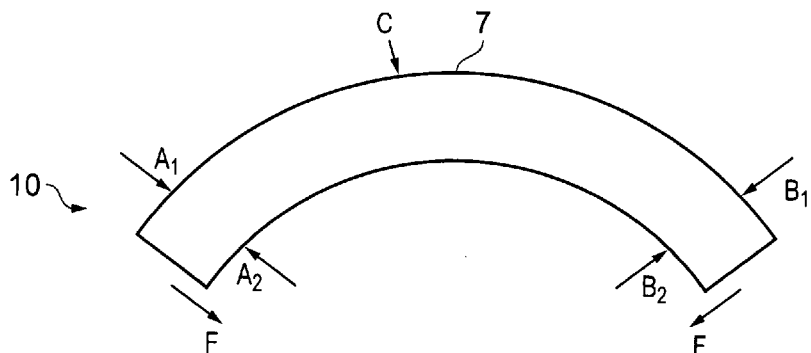

FIG. 7 schematically illustrates a circuit diagram for a capacitor cell associated with FIG. 6;

FIGS. 8A and 8B each illustrate different examples of a system comprising a signal generator for providing the input signal to the capacitance touch sensor arrangement with integrated at least one variable resistor sensor and processing circuitry configured to detect a real and imaginary components;

FIG. 9 illustrates an example of analysis circuitry;

FIG. 10 illustrates an example of a record carrier comprising computer code;

FIG. 11 illustrates an example cross-section through a portion of the apparatus;

FIG. 12 illustrates an example of contortion of an apparatus; and

Figure 13:
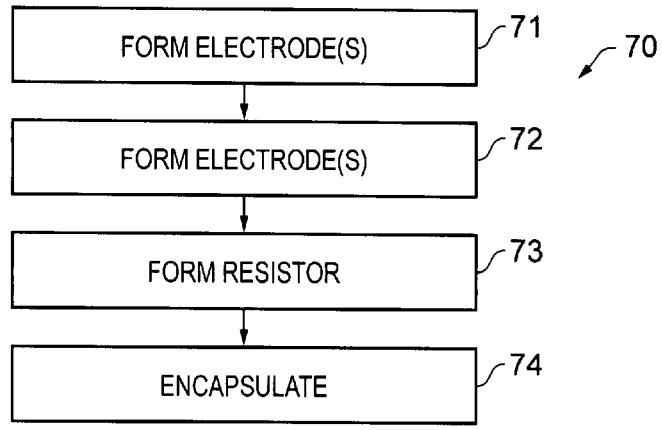

FIG. 13 illustrates a manufacturing method.

For ease of understanding similar reference numerals identify similar features in different figures.

DETAILED DESCRIPTION

Figure 1:
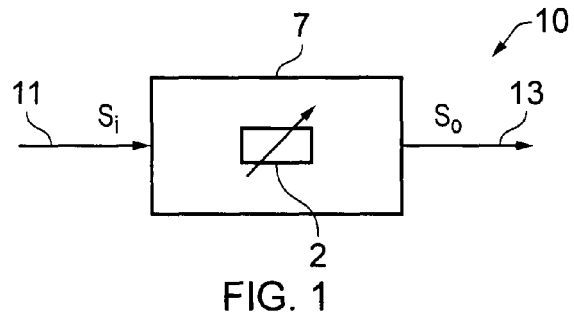
FIG. 1 illustrates an example of an apparatus comprising a capacitance touch sensor arrangement for detecting a user touch and at least one variable resistor sensor integrated within the capacitance touch sensor arrangement.

FIG. 1 illustrates an example of an apparatus 10. The apparatus 10 comprises: a capacitance touch sensor arrangement 7 for detecting a user touch and at least one variable resistor sensor 2 integrated within the capacitance touch sensor arrangement 7.

The capacitance touch sensor arrangement 7 is configured to have a variable capacitance that varies, for example, when a user finger touches the capacitance touch sensor arrangement 7. The touch sensor arrangement 7 may comprise a touch surface that is configured for user touch.

The illustrated capacitance touch sensor arrangement 7 is configured as a touch or proximity detector. When a user touches the touch sensor arrangement 7 charge is sourced from or sunk at the user changing the capacitance of the touch sensor arrangement 7.

The at least one variable resistor sensor 2, integrated within the capacitance touch sensor arrangement 7 has a variable resistance that varies with a sensed parameter.

The integration of one or more variable resistor sensors enables the touch sensor arrangement 7 to be used to sense more than touch. A variable resistance sensor 4 may have a variable resistance that varies with, for example, strain, presence of a specific chemical or biochemical molecule, incident light etc.

If, for example, a variable resistor sensor 2 has a variable resistance that varies with strain then it may be used to additionally determine forcefulness of a user touch on the capacitance touch sensor arrangement 7.

If, for example, a variable resistor sensor 2 has a variable resistance that varies with strain then it may be used to additionally determine whether, how and to what degree an apparatus 10 comprising the capacitance touch sensor arrangement 7 is resiliently contorted.

Contortion is the deformation of a body by twisting and/or bending. The extent of distortion facilitated by the body depends upon implementation. Resilient contortion implies that the body stays in its contorted state while held in that state and returns to its equilibrium shape when released.

The apparatus 10 comprises an input configured to receive an input signal 11 comprising a time varying component.

The apparatus 10 also comprises an output configured to provide an output signal 13 that depends simultaneously upon both the capacitance of the capacitance touch sensor arrangement 7 and the resistance of the variable resistance sensor 2.

The integration of the at least one variable resistor sensor 2 within the capacitance touch sensor arrangement 7 results in a single common output that depends simultaneously upon both the capacitance of the capacitance touch sensor arrangement 7 and the resistance of the variable resistance sensor 2.

Figure 2:
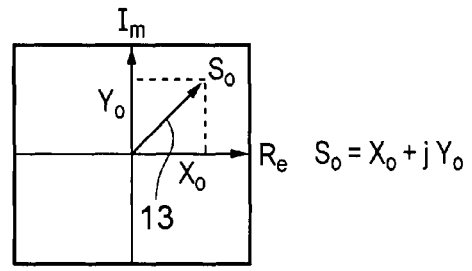
FIG. 2 illustrates an example of an output signal that depends upon both the capacitance of the capacitance touch sensor arrangement and the resistance of the variable resistance sensor.

FIG. 2 is an Argand diagram illustrating an example of an output signal 13 that depends upon both the capacitance of the capacitance touch sensor arrangement 7 and the resistance of the variable resistance sensor 2.

The output signal 13 has a real component Xo and an imaginary component Yo. The imaginary component has a phase lead over the real component of $\pi/2$ radians that is they are orthogonal (in quadrature).

It is therefore possible to process the output signal 13 to determine the real component Xo and an imaginary component Yo. It is also possible to analyse the real component Xo and an imaginary component Yo to detect changes in the capacitance of the capacitance touch sensor arrangement 7 and/or the resistance of the variable resistance sensor 2. This provides useful information to differentiate bending, twisting and stretching of the apparatus including inputs such as touch, hover, pressure.

Figure 3:
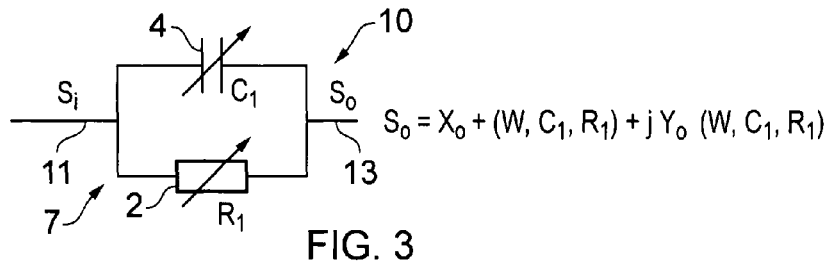
FIG. 3 illustrates a simple example of a capacitance touch sensor arrangement comprising an integrated variable resistor sensor.

FIG. 3 illustrates a simple example of a capacitance touch sensor arrangement 7 comprising an integrated variable resistor sensor 2.

In this example, the resistance R1 of the variable resistor sensor 2 is connected in electrical parallel to the variable capacitance C1 of the capacitance touch sensor arrangement 7. The total impedance of the apparatus 10 is $Z(R1)//Z(C1)$. This may be expressed as $Xo(w, C1, R1)+j (w, C1, R1)$ where w is frequency.

It is therefore possible in this example and other examples to match a change in the measured value of Xo and Yo with a change in C0 and/or R1 either algebraically or using pre-stored calibration data. It may, in some circumstances, be necessary to measure Xo and Yo are different values of w.

Figure 4:
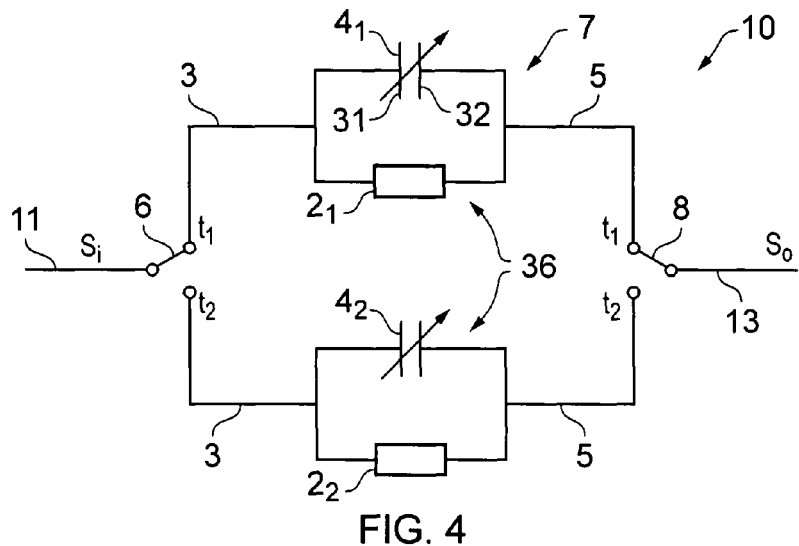
FIG. 4 illustrates an example of a capacitance touch sensor arrangement comprising an integrated variable resistor sensor, where the capacitance touch sensor arrangement comprises a plurality of capacitor cells that are distributed over an area.
Figure 5:
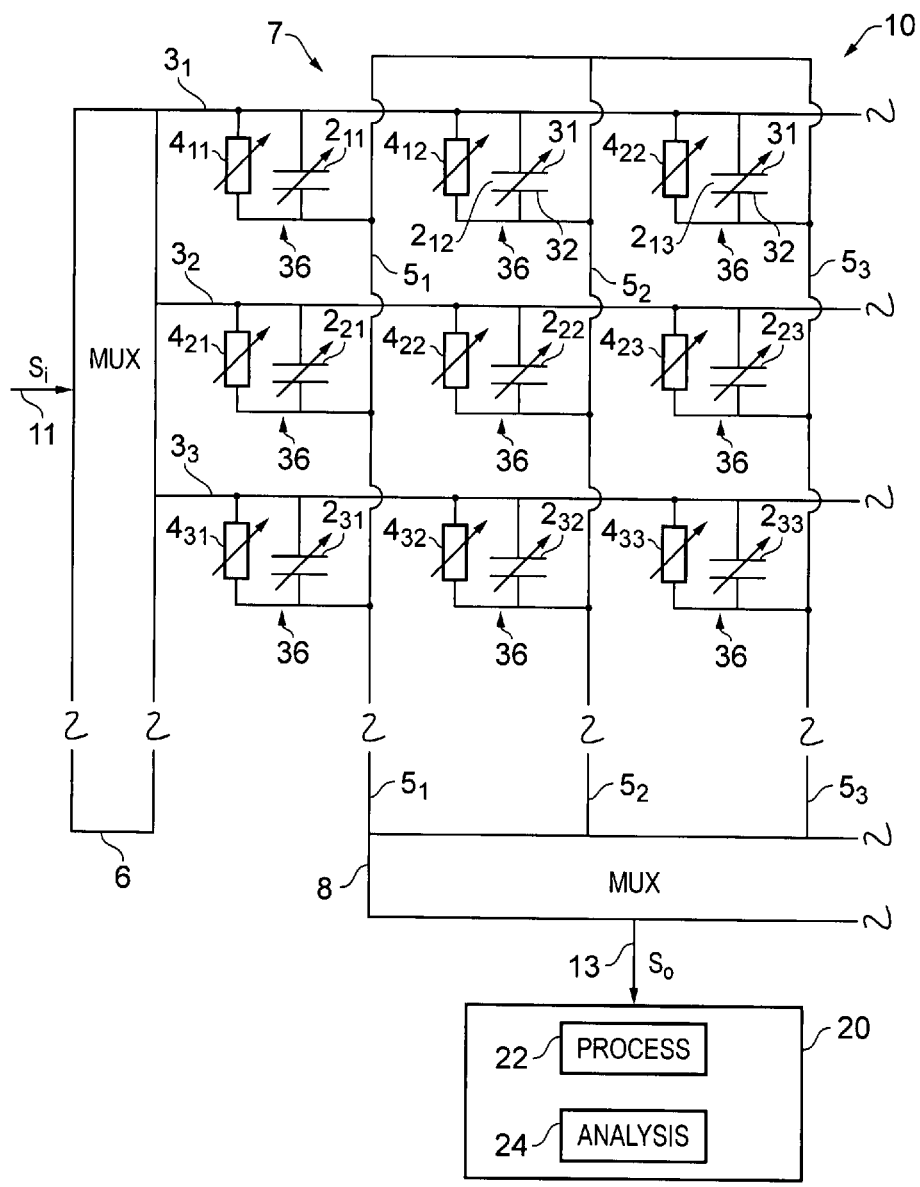
FIG. 5 illustrates an example of a capacitance touch sensor arrangement comprising an integrated variable resistor sensor, where the capacitance touch sensor arrangement comprises a plurality of capacitor cells that are distributed over an area in a regular array.

In FIGS. 4, 5 and 6 the capacitance touch sensor arrangement 7 comprises a plurality of capacitor cells 36 that are distributed over an area. When a user touches the touch sensor arrangement 7 charge is sourced from or sunk at the user changing the capacitance of one or more capacitor cells of the touch sensor arrangement 7. Identifying which of the capacitors cells has changed capacitance enables the location(s) of the user touch to be determined.

If the capacitance touch sensor arrangement 7 comprises a plurality of capacitor cells 36 that are distributed over an area, then some or all of the cells may comprise one or more variable resistor sensors 2. In the examples of FIGS. 4 and 5 a cell comprises a single resistor sensor 2, however, in the example of FIG. 6 a cell comprises multiple resistor sensors 2.

If more than one variable resistor sensor 4 is integrated within the capacitance touch sensor arrangement 7 then the variable resistor sensors 4 may respond to the same or to different sensed parameters.

If more than one variable resistor sensor 4 is integrated within a capacitor cell 36 of the capacitance touch sensor arrangement 7 then the variable resistor sensors 4 may respond to the same or to different sensed parameters.

A variable resistance sensor 4 may have a variable resistance that varies with, for example, strain, presence of a specific chemical or biochemical molecule, light, temperature etc.

The capacitance touch sensor arrangement 7 comprises a plurality of capacitor cells 36 that share in common the input 3 and share in common the output 5. In the illustrated example, each of a plurality of capacitor cells comprises at least one variable resistor sensor 2 having a variable resistance that varies with the sensed parameter. However, in some embodiments every capacitor cell 36 does not have a variable resistor sensor 2. In some embodiments a capacitor cell 36 that has a variable resistor sensor 2 has one or more variable resistor sensors 2 connected in series or parallel.

Each of the plurality of capacitor cells 36 comprises a first capacitor electrode 31 associated with the input 3 and a second capacitor electrode 32 associated with the output 5 and at least one variable resistor sensor 2 connected between the first capacitor electrode 31 and the second capacitor electrode. The variable resistor sensor 2 is therefore connected in electrical parallel to the capacitor formed by the first capacitor electrode 31 and the second capacitor electrode 32.

Each of the capacitor cells 36 is separately tested. First selection circuitry 6 switches to direct the input signal 11 to a particular cell. Second selection circuitry 8 switches to direct the output signal 13 from a particular cell. The first selection circuitry 6 and the second selection circuitry 8 are synchronised so that they simultaneously direct the input signal 11 to and direct the output signal 13 from, the same 'active' capacitor cell 36.

The apparatus 10 also comprises an output configured to provide an output signal 13 that depends simultaneously upon both the capacitance of the capacitance of an active cell of the capacitance touch sensor arrangement 7 and the resistance of the variable resistance sensor 2 (if any) in the active cell.

In FIG. 4, the first selection circuitry 6 is a bi-state switch that switches to direct the input signal 11 to one of two capacitor cells 36. The second selection circuitry 8 is a bi-state switch that switches to direct the output signal 13 from one of two capacitor cells 36.

In FIGS. 5 and 6, the capacitor cells 36 are arranged as an array (grid). The capacitance touch sensor arrangement 7 comprises a distributed network of capacitor cells 36 arranged as an array. In the illustrated examples, the array is regular comprising regularly spaced parallel rows and regularly spaced parallel columns. In the illustrated examples, the array is also orthogonal in that the rows are orthogonal to the columns. However, for some applications the array may not be regular and/or may not be orthogonal.

The first selection circuitry 6 is a multiplexer that switches to direct the input signal 11 to a row of capacitor cells 36. The second selection circuitry 8 is a multiplexer that switches to direct the output signal 13 from a column of capacitor cells 36. Each row therefore shares a common input 3 through multiplexer 6 and each column shares a common output 5 through multiplexer 8.

Each of the capacitor cells 36 is separately tested. The multiplexer 6 switches to direct the input signal 11 to a particular 'active' row of cells 36. The multiplexer 8 switches to direct the output signal 13 from a particular 'active' row of cells. The first selection circuitry 6 and the second selection circuitry 8 are synchronised so that they simultaneously direct the input signal 11 to and direct the output signal 13 from, the same 'active' capacitor cell 36 that is in both the active row and the active column.

The first selection circuitry 6 is configured to sequence the row to which the input signal 11 is provided through a series of different rows. Each row may be made active once in a period T1 for a time T2. The second selection circuitry 8 is configured to sequence the column from which the output signal 13 is received through a series of different columns. Each column may be made active once in the time period T2.

It should be appreciated that although it is described that input is provided to rows and output taken from columns, this may be reversed, so that input is provided to columns and output taken from rows. Depending upon context, the terms 'row' and 'column' may therefore be interchanged.

In these examples, the capacitance touch sensor arrangement 7 comprises a distributed network of electrodes arranged as a regular array comprising rows and columns. Each row has a common distribution of capacitance and resistance and each column has a common distribution of capacitance and resistance. The first selection circuitry 6 is configured to selectively provide the input signal 11 to a first portion of the capacitance touch sensor arrangement 7 and second selection circuitry 8 is configured to selectively receive the output signal 13 from a second portion of the capacitance touch sensor arrangement 7. Changes in the common distribution of capacitance and resistance can therefore be detected.

Each row comprises a first plurality of interconnected first electrodes 31 and each column comprises a second plurality of interconnected second electrodes 32 and at least one variable resistor sensor 4 is associated with each row and/or column. In the illustrated examples, at least one variable resistor sensor 2 is connected between each row interconnect 3 and each column interconnect 5, where the rows and column cross, and connected in parallel to a capacitor formed by a first electrode and a second electrode.

The apparatus 10 comprises processing circuitry 22 configured to process output signals 13 from different areas (cells) of the capacitance touch sensor arrangement 7, each of which has an integrated at least one variable sensor, to determine the current capacitance for the different areas and the current resistance for the different areas. The apparatus 10 comprises analysis circuitry 24 configured to analyse the current capacitance and the current resistance for the different areas (cells).

The processing circuitry 22 and the analysis circuitry may be integrated in a module 20 or they may be provided separately.

In FIG. 5, each capacitor cell comprises a single capacitor from an input capacitor electrode 31 and an output capacitor electrode 32. Each capacitor cell 36 also comprises a variable resistor sensor connected in electrical parallel to the capacitor formed by the input capacitor electrode 31 and the output capacitor electrode 32.

In FIG. 6, the rows of input capacitor electrodes 31 connected to the input 3 via multiplexer 6 form an input electrode array. There is a pitch D between the rows and between the input capacitor electrodes 31. The columns of output capacitor electrodes 32 connected to the output 5 via multiplexer 8 form an output electrode array. There is a pitch D between the rows and between the output capacitor electrodes 31. The input electrode array and the output electrode array are parallel and are off-set from each other by D/2 in the row direction and the column direction. The input capacitor electrodes 31 and the output capacitor electrodes 32 therefore no not overlap but do approach closely in a lateral direction (in the plane of the array).

FIG. 7 schematically illustrates a capacitor cell 36 associated with input capacitor electrode $31_{n,m}$, where n designates a row and m designates a column. The input capacitor electrode $31_{n,m}$ is adjacent 4 distinct output capacitor electrodes (see FIG. 6). There is one $32_{n-1,m}$ to the top-left, one $32_{n-1,m+1}$ to the top right, one $32_{n,m}$ to the bottom left and one $32_{n,m+1}$ to the bottom right. Each of the output capacitor electrodes $32_{n-1,m}$; $32_{n-1,m+1}$; $32_{n,m}$ and $32_{n,m+1}$ pairs laterally with the input capacitor electrode $31_{n,m}$ to form a capacitor 4.

A variable resistor sensor 2 is formed in electrical parallel to each of the capacitors 4. Each of the variable resistors sensors 4 is formed as a bridge across a gap between the input capacitor electrode $31_{n,m}$ and the respective one of the paired output capacitor electrodes 32.

Spacers 34 may be used to separate the interconnect between the input capacitor electrodes 31 in a row and the interconnect between the output capacitor electrodes 32 in a column where the rows and columns cross over. The spacers may be a dielectric. The spacers 34 could also be piezoresistive and form the variable resistor sensors 4.

FIGS. 8A and 8B illustrates a system comprising a signal generator 26 for providing the input signal 11 to the capacitance touch sensor arrangement 7 with integrated at least one variable resistor sensor 2 and processing circuitry 22 configured to detect a first signal value comprising at least a real component and configured to detect a second signal value comprising at least an imaginary component, wherein the first component and the second component have a known phase off-set. The first signal value is typically the real component Xo of the output signal 13 and the second value is typically the imaginary component Yo of the output signal 13.

In FIG. 8A, the signal generator 26 simultaneously provides an input signal 11 that comprises an alternating component and a static component. The alternating component may be at a single frequency or a mixture of frequencies.

The processing circuitry 22 comprises a low-pass filter 40 that filters the output signal 13 blocking the alternating component but allowing the static (dc) component Xo to pass.

The processing circuitry 22 comprises in parallel to the low-pass filter 40 a high pass filter 42 that filters the output signal 13 blocking the static (dc) component but allowing the alternating (ac) component Yo to pass. A rectifier and filter 44 may be used further process the filtered signal.

In FIG. 8B, the signal generator 26 simultaneously provides an input signal 11 that comprises an alternating component only. The alternating component may be at a single frequency.

The processing circuitry 22 comprises a lock-in amplifier 50 that receives the output signal 13 as an input and the input signal 11 as a reference. It produces as a first output, Xo, the in-phase component and as a second output, Yo, the quadrature-phase component.

After a signal Xo dependent upon the current resistance and a signal Yo dependent upon the current capacitance have been isolated by the processing circuitry 22 they may be analysed.

Analysis circuitry 24 may be configured to analyse the current capacitance and the current resistance for the different capacitor cells 36 (located at different areas) to:
a) detect a location of user touch input
b) estimate a magnitude of pressure applied by a user touch input
c) estimate a contortion of the apparatus 10 by the user The analysis may use stored calibration data.

The analysis circuitry 24 may be configured to analyse the current capacitance Yo and the current resistance Xo for the different areas/cells 36 to detect a pattern of user touch inputs.

The pattern may be used to disambiguate between a touch input and a contortion. It may also be used to disambiguate between different contortions such as bend and twist. It may also be used to estimate the contortion of the apparatus 10 by the user.

Disambiguation between a touch input and a contortion may be achieved because when there is a touch input the touch (capacitance change) and the strain (variable resistance change) occur at the same area (the same cell). This is illustrated in FIG. 11.

When there is a contortion of the apparatus 10, for example as illustrated in FIG. 12, the position where the user bends the apparatus is different to where (A1, A2; B1, B2) the user holds the apparatus 10 to apply the contorting force F. There will therefore be an area C where there is strain (variable resistance change) without touch (capacitance change).

When the current capacitance and the current resistance, for an area, are indicative of a deforming touch by a user, the current capacitance and the current resistance for the area are used to detect a user touch input at the area.

When the current capacitance and the current resistance, for an area are not indicative of a deforming touch by a user, the current capacitance and the current resistance for the area may be used in determining a contortion of the apparatus 10.

Disambiguation between contortions may be achieved by analysing the spatial distribution of strain (variable resistance change). The analysis circuitry may be configured to analyse a spatial distribution of the current capacitance and the current resistance for the different areas, to disambiguate different contortions of the apparatus.

For example, if two variable resistor sensors lie apart in a common plane, they are exposed to opposite strain when the apparatus is bent in the plane. The variable resistor sensor on the outside of the bend suffers compression (variable resistance decrease) whereas the other variable resistor sensor on the inside of the bend suffers expansion (variable resistance increase).

For example, if variable resistor sensors lie along a line in a common plane with a first variable resistor sensor being positioned towards a first edge of the apparatus, a second variable resistor sensor being positioned away from the first edge and away from a second edge of the apparatus that opposes the first edge and a third variable resistor sensor being positioned towards the second edge of the apparatus, then when the apparatus is twisted the plane also twists. The first and third variable resistor sensors that are positioned towards the edges suffer expansion (variable resistance increase) whereas the second variable resistor sensor does not or does not to the same extent.

It may still be possible to operate the analysis circuitry 24 to detect a new touch even during a contortion of the apparatus. The output from the capacitance touch sensor arrangement 7 with integrated at least one variable resistor sensor 2 is constant while the apparatus remains in a contorted state and deviations from the constant value may be used to detect touches while the contortion is stable and unchanging.

It may be possible to operate the analysis circuitry 24 in a touch only mode in which it analyses only the current capacitance for the different areas to detect a pattern of user touch inputs as well as one or more other modes where the current resistance and capacitance for the different areas is used to detect other parameters.

The analysis circuitry 24 may be configured to compensate for slowly varying changes in the resistance, for example as a result of ambient temperature.

FIG. 11 illustrates an example cross-section through a portion of an example of the apparatus 10. The capacitance touch sensor arrangement 7 and the at least one variable resistor sensor 2 integrated within the capacitance touch sensor arrangement 7 are, in this example, flexible and stretchable, being capable of withstanding strain in excess of 5%. The capacitance touch sensor arrangement 7 and the at least one variable resistor sensor 2 integrated within the capacitance touch sensor arrangement 7 may be transparent. The electrodes 31, 32 of the capacitance touch sensor arrangement 7 are distributed on a conformal, stretchable membrane 60 and may be applied to the substrate 60 using printing technologies.

The substrate 60 may, for example, comprise: polydimethylsiloxane (PDMS), polyurethane, polyethylene terephthalate (PET), stretchable substrates e.g. elastomeric; silicones (e.g. polydimethylsiloxane) or polyurethanes.

The capacitor electrodes 31, 32 may be formed from one or more of: metal, silver nanowires, carbon nanotubes networks, graphene derivatives, indium tin oxide, graphene.

A separator 62 separates the capacitor electrodes 31, 32. The separator 62 may be a contortable dielectric between the electrodes where the dielectric properties of the contortable dielectric change when contorted. The separator 62 may, for example, be a dielectric, quantum tunnelling composite (Peratech) a polymer/elastomer, or an ion gel.

The variable resistor sensors 2 integrated within the capacitance touch sensor arrangement 7 may be formed from: gold, graphene, carbon nanotubes and/or silver nanowires.

For example, a variable resistor sensor 2 may be a track of gold. For example, a variable resistor sensor 2 may be a track of gold that has a width and/or thickness of less than 50 nm.

As previously described, different variable resistor sensors 2 that vary with different sensed parameters may be formed. The sensed parameters include strain, a predetermined biological or chemical molecule, incident light, ambient temperature etc.

Although FIG. 12, illustrates an example of the apparatus 10 that may detect contortion, other examples of apparatus 10 may not and the variable resistance sensors 2 may respond to parameters other than stress. The substrate 60 may be rigid.

FIG. 13 illustrates a method 70 of manufacturing one example of a capacitance touch sensor arrangement 7 comprising at least one integrated variable resistor 2.

At block 71, one or more first capacitor electrodes 31 are selectively formed.

At block 72, one or more second capacitor electrodes 32 are selectively formed.

At block 73, at least one variable resistor sensor 2 is formed between a first capacitor electrode 31 and an adjacent second capacitor electrode 32. The variable resistor sensor 2 can be formed using soft deformable materials which can be transparent.

The second capacitor electrodes 32 are separated from the first capacitor electrodes by dielectric. In some but not necessarily all embodiments some or all of the variable resistor sensors 2 may be arranged to provide the separation between the first capacitor electrodes 31 and the second capacitor electrodes 32.

At block 74, an encapsulating layer is formed.

The method may additionally comprise, in some embodiments, forming electrically parallel first interconnects that serially interconnect different capacitor electrodes, forming electrically parallel second interconnects that serially interconnect different second capacitor electrodes. The method may also comprise forming variable resistor sensors 2 between different pairs of first and second interconnects. Each variable resistor sensor 2 has a resistance greater that a combined resistance of a current path through the first and second interconnects to which it is connected. At least one variable resistor sensor 2 may be formed in electrical parallel to each capacitor formed by the pairing of adjacent first and second electrodes.

The term 'connected' means operationally coupled and any number or combination of intervening elements can exist (including no intervening elements).

The analysis circuitry 24 previously described may be implemented using instructions that enable hardware functionality, for example, by using executable computer program instructions in a general-purpose or special-purpose processor that may be stored on a computer readable storage medium (disk, memory etc) to be executed by such a processor 62.

Referring to FIG. 9, a processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions that control the operation of the apparatus 10 when loaded into the processor 62. The computer program instructions 66 provide the logic and routines that enables the apparatus to perform the methods described. The processor 62 by reading the memory 64 is able to load and execute the computer program 66.

The apparatus 10 therefore comprises: at least one processor 62; and at least one memory 64 including computer program code 66 the at least one memory 64 and the computer program code 66 configured to, with the at least one processor 62, cause the analysis circuitry to perform as described.

The computer program may arrive at the apparatus 10 via any suitable delivery mechanism 68. The delivery mechanism 68 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 66. The delivery mechanism may be a signal configured to reliably transfer the computer program 66. The apparatus 10 may propagate or transmit the computer program 66 as a computer data signal.

Although the memory 64 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user.

The blocks illustrated in the FIG. 13 do not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, although some of the above described examples (e.g. FIG. 3) illustrated have the resistance R1 of the variable resistor sensor 2 connected in electrical parallel to the variable capacitance C1 of the capacitance touch sensor arrangement 7, in other arrangements the resistance R1 of the variable resistor sensor 2 may be connected in electrical series with the variable capacitance C1 of the capacitance touch sensor arrangement 7. The electrical connection of the variable resistor sensor 2 to the capacitor of the touch sensor arrangement 7 may therefore be a parallel electrical connection or a series electrical connection.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I/we claim:

1. An apparatus comprising:
   a capacitance touch sensor arrangement configured to have a variable capacitance that varies when a user finger touches the capacitance touch sensor arrangement; and
   at least one variable resistor sensor integrated within the capacitance touch sensor arrangement wherein the variable resistor sensor has a variable resistance that varies with a sensed parameter;
   the apparatus comprising an input configured to receive, during a first time, an input signal comprising a time varying component and an output configured to provide, during the first time, a time varying output signal that depends simultaneously upon both a time variation of the capacitance of the capacitance touch sensor arrangement during the first time in response to a user touch, and a time variation of the resistance of the variable resistance sensor during the first time in response to a sensed parameter.

2. An apparatus as claimed in claim 1, wherein the capacitance touch sensor arrangement and the at least one variable resistor sensor integrated within the capacitance touch sensor arrangement are flexible and stretchable, being capable of withstanding strain in excess of 5%.

3. An apparatus as claimed in claim 1, wherein the capacitance touch sensor arrangement comprises a distributed network of electrodes on a conformal, stretchable membrane.

4. An apparatus as claimed in claim 1, wherein the capacitance touch sensor arrangement and the at least one variable resistor sensor integrated within the capacitance touch sensor arrangement are transparent.

5. An apparatus as claimed in claim 1, wherein the capacitance touch sensor arrangement further comprises a plurality of rows and a plurality of columns, such that each row comprises a first plurality of interconnected first electrodes and wherein each column comprises a second plurality of interconnected second electrodes and at least one variable resistor is associated with each row and/or column.

6. An apparatus as claimed in claim 5, wherein the at least one variable resistor sensor is connected between each row and column, where the rows and column cross, and connected in parallel to a capacitor formed by a first electrode and a second electrode.

7. An apparatus as claimed in claim 5, wherein the first electrodes and the second electrodes do not overlap.

8. An apparatus as claimed in claim 1, comprising first variable resistor sensors that vary with a first sensed parameter and second variable resistor sensors that vary with a second sensed parameter.

9. An apparatus as claimed in claim 1, wherein variable resistors integrated within the capacitance touch sensor arrangement have a resistance that changes with applied strain, or that changes with a predetermined biological or chemical molecule, or that changes with incident light.

10. An apparatus as claimed in claim 1, comprising first selection circuitry configured to selectively provide the input signal to a first portion of the capacitance touch sensor arrangement
and second selection circuitry configured to selectively receive the output signal from a second portion of the capacitance touch sensor arrangement, wherein the second portion overlaps the first portion of the first portion of the capacitance touch sensor arrangement.

11. An apparatus as claimed in claim 10, wherein the first selection circuitry is configured to sequence the first portion to which the input signal is provided through a series of different first portions of the capacitance touch sensor arrangement and the second selection circuitry is configured to sequence the second portion from which the output signal is received through a series of different second portions of the capacitance touch sensor arrangement.

12. An apparatus as claimed in claim 1, further comprising:
circuitry configured to process output signals from different areas of the capacitance touch sensor arrangement, each of which has an integrated at least one variable sensor, to determine the current capacitance for the different areas and the current resistance for the different areas;
analysis circuitry configured to analyse the current capacitance and the current resistance for the different areas.

13. An apparatus as claimed in claim 12, wherein the analysis circuitry is configured to analyse the current capacitance and the current resistance for the different areas to detect a user touch input and estimate a magnitude of pressure applied by the user touch input or to estimate a contortion of the apparatus by the user.

14. An apparatus as claimed in claim 12, wherein the analysis circuitry is configured, in a touch only mode, to analyse only the current capacitance for the different areas to detect a pattern of user touch inputs and is configured in another mode to analyse the current capacitance and the current resistance for the different areas.

15. An apparatus as claimed in claim 12, wherein the analysis circuitry is configured to analyse the current capacitance and the current resistance for the different areas, wherein when the current capacitance and the current resistance, for an area, are indicative of a deforming touch by a user, using the current capacitance and the current resistance for the area to detect a user touch input at the area and wherein when the current capacitance and the current resistance, for an area are not indicative of a deforming touch by a user, using the current capacitance and the current resistance for the area in determining a contortion of the apparatus.

16. An apparatus as claimed in claim 1, wherein the variable resistance varies with an externally controlled parameter.

17. An apparatus as claimed in claim 1, wherein the capacitance touch sensor arrangement comprises a plurality of capacitor cells distributed over an input area wherein each of the capacitor cells comprises at least one variable capacitor and one or more of the capacitor cells comprises at least one variable resistor sensor,
wherein the capacitance of the variable capacitor of a capacitor cell changes when the user touches the input area corresponding to that capacitor cell,
wherein when a capacitor cell receives the input signal at a first time it provides an output signal dependent upon both the capacitance of the variable capacitor at the first time, and a resistance of the variable resistor at the first time.

18. An apparatus as claimed in claim 17, wherein the capacitor cells share in common the input and share in common the output.

19. A method of manufacturing a capacitance touch sensor arrangement comprising at least one integrated variable resistor, comprising:
selectively forming a plurality of first capacitor electrodes;
selectively forming a plurality of second capacitor electrodes;
selectively forming at least one variable resistor sensor in electrical connection with a capacitor formed between a first capacitor electrode and an adjacent second capacitor electrode;
forming an input configured to receive, during a first time, an input signal comprising a time varying component; and
forming an output configured to provide, during the first time, a time varying output signal that depends simultaneously upon both a time variation of the capacitance of the capacitance touch sensor arrangement during the first time in response to a user touch, and a time variation of the resistance of the variable resistance sensor during the first time in response to a sensed parameter.

20. A method as claimed in claim 19, further comprising forming an encapsulating layer.

* * * * *